United States Patent

Stokes

[15] 3,642,559
[45] Feb. 15, 1972

[54] MEMBRANE-LINED STRUCTURAL PANEL

[72] Inventor: William S. Stokes, 941 N. Placentia Ave., Fullerton, Calif. 92634

[73] Assignee: William S. Stokes, Westminster, Calif.

[22] Filed: Feb. 20, 1970

[21] Appl. No.: 13,014

[52] U.S. Cl. ............................ 161/38, 52/309, 161/89, 161/93, 161/254, 161/255, 161/256, 161/402, 264/228, 264/271
[51] Int. Cl. .................. B32b 13/12, B32b 25/08, E04c 1/24
[58] Field of Search ................. 161/57, 58, 87, 88, 89, 92, 161/93, 94, 95, 96, 111, 112, 113, 114, 115, 143, 144, 151, 156, 170, 203, 402, DIG.4, 254, 255, 256, 38, 39; 52/309, 515, 516; 264/228, 271

[56] References Cited

UNITED STATES PATENTS

| | | | |
|---|---|---|---|
| 3,150,032 | 9/1964 | Rubenstein | 161/161 |
| 2,342,556 | 2/1944 | Rockoff | 18/59 |
| 2,653,118 | 9/1953 | Seymour | 161/93 |
| 3,001,213 | 9/1961 | Starn et al. | 161/94 |

Primary Examiner—William A. Powell
Assistant Examiner—James J. Bell
Attorney—Flam and Flam and Howard A. Silber

[57] ABSTRACT

A membrane-lined structural panel comprising a laminated membrane bonded to a surface of a concrete structural panel. The membrane itself comprises an outer sheet of fluid-impervious, synthetic polymer resin adhesively bonded to a rubber elastomeric layer. The membrane rubber layer is cold-flow bonded to the concrete panel. The article may be fabricated by placing the membrane system resin sheet down on a pouring platform, tackifying the rubber layer, placing a pouring frame atop the membrane, and pouring wet concrete in the frame over the membrane. As the concrete hardens, the tackified rubber cold-flows into the concrete to bind the membrane to the panel. The resultant structural panel readily can be removed from the pouring platform without the need for a release compound.

9 Claims, 6 Drawing Figures

PATENTED FEB 15 1972

*INVENTOR.*
WILLIAM S. STOKES
BY
*Hinderstein & Silber*
ATTORNEYS

INVENTOR.
WILLIAM S. STOKES

BY Hinderstein & Silber

ATTORNEYS

MEMBRANE-LINED STRUCTURAL PANEL

BACKGROUND OF THE INVENTION

1. Field of the Invention

The present invention relates to a membrane-lined structural panel and a method of making the same. More particularly, the invention relates to a structural panel comprising a laminated, composite fluid impervious membrane system which is cold-flow bonded to the surface of a concrete panel.

2. Description of the Prior Art

In recent years, there has been a significant increase in the use of prefabricated concrete panels for walls, floors and other structural members of a building. Such panels have gained particularly widespread acceptance for use as curtain walls in high-rise buildings having either reinforced concrete or steel superstructures. The use of such preformed members is particularly desirable since the panels can be precast either on site or elsewhere and installed readily as soon as the building supporting columns have been completed. Moreover, since all panels typically may be of the same shape and size, considerably cost economy can be effected by precasting the panels, thereby eliminating the need for expensive custom framing when the walls are poured in place on the building.

Despite such wide acceptance, various shortcomings have been inherent in all precast concrete panels. Some of these limitations are related to the manufacturing methods employed, and others to the characteristics of the concrete panel itself. Certain of these shortcomings are outlined below.

Most prior art prefabricated concrete panels are poured directly on a pouring platform such as a plywood sheet placed on the floor of a factory. The platform first is sprayed with a release compound, typically a silicone or like material. A steel or wooden frame then is place on the platform and the wet concrete poured directly thereon. After the concrete has hardened, the panel is lifted from the pouring platform using an overhead crane.

It is not unusual that as such a prior art panel is lifted from the platform, portions of the panel tend to stick to the platform, even though considerable care has been taken in applying the release compound. As a result of this sticking, the surface of the panel often chips off; occasionally the panel breaks or cracks so extensively that it cannot be used for its intended purpose and must be rejected. Moreover, even if the panel does not crack upon removal, the tendency to stick to the platform often introduces stresses in the green concrete panel, representing points of weakness susceptible to cracking after the panel is installed.

Once installed in the building, prior art concrete structural panels also have various limitations. In many instances, the external surface of the raw concrete has an unsightly or esthetically unpleasing appearance. This has lead to the utilization of stone aggregate concretes, which significantly increase cost of the panel. Alternatively, the panel exteriors have been painted subsequent to installation. Such painted surfaces have limited lifetimes, and require periodic sand blasting and repainting to maintain the attractivensss of the building. This problem is particularly acute since concrete surfaces are known to develop unsightly water marks in areas where rainwater has dripped down the panel surface.

A concrete panel exterior also tends to develop hairline cracks which hold water when exposed to rain. Particularly in cold climates, freezing of the water in the cracks often causes cracking or spalling of the panel surface. In extreme cases, the fissures may become so large as to result in leakage through the precast concrete panel wall.

These and other shortcomings of the prior art are overcome by utilizing the inventive structural panel. The panel incorporates a laminated membrane cold-flow bonded to a concrete panel. The membrane system itself acts as a decoratively colored outer surface for the panel, and requires no subsequent painting or maintenance. Moreover, the membrane is fluid impervious, completely eliminating the problems associated with water seepage into cracks in a concrete panel. In addition, the membrane system itself functions as a "bond breaker," eliminating the need for a release compound between the panel and the pouring platform, and significantly reducing the number of panels rejected on fabrication.

SUMMARY OF THE INVENTION

In accordance with the present invention, there is provided a membrane-lined structural panel and method of making the same. The article comprises a laminated membrane having an outer sheet of fluid-impervious, synthetic polymer resin adhesively bonded to an oriented rubber elastomeric layer. The rubber layer in turn is cold flow bonded to a concrete panel.

In a preferred embodiment, the membrane outer sheet comprises a polyvinyl chloride formulation including a polymeric plasticizer, epoxy resin, a stabilizer and other additives. A scrim of synthetic resin fiber is completely imbedded within the polyvinyl chloride to form a unitary outer sheet which is fluid impervious, has excellent weathering capabilities, and can withstand high static or dynamic loading without tearing and without exhibiting "compression set."

The elastomeric layer preferably comprises a polychloroprene (Neoprene rubber, together with an accelerator to give vulcanization on curing and other additives. Alternatively, butyl rubber, various butadiene rubbers or acrylonitrile may be used. In certain embodiments the rubber exhibits considerable resilience parallel to the plane of the elastomeric layer. The elastomeric layer functions to isolate the membrane outer sheet from movement or cracking of the concrete panel to which the membrane system is applied. The elastomeric layer is cold-flow bonded to the concrete to provide an extremely adherent interface between the concrete panel and the membrane system.

The inventive structural panel may be fabricated by placing the membrane system directly on the pouring platform, with the outer sheet facing the platform. The exposed membrane rubber layer then is tackified by spraying with a solvent for the rubber or a tack solution. An appropriate pouring frame is placed over the membrane system, and the wet concrete poured directly into contact with the tackified membrane surface. As the wet concrete hardens, the rubber cold-flows into the concrete to bond the membrane system firmly to the concrete panel. Since there is no tendency of the synthetic resin outer sheet to adhere to the pouring platform, the inventive structural panel may be removed readily from the platform without the need for a release compound.

For panels of large size, the membrane system may be provided in abutting sections. A fluid-impervious joint is formed at the junction of the membrane sections by overlaying a membrane strip along the abutting edges. The membrane strip itself may comprise a synthetic polymer resin layer laminated to a rubber elastomeric layer. Preferably, the rubber layer of the membrane strip is in contact with the elastomeric layers of the membrane sections. A rubber-based adhesive then is used between the membrane strip and the concrete panel.

Thus it is an object of the present invention to provide a membrane-lined structural panel and a method of making the same.

Another object of the present invention is to provide a structural article including a concrete panel bonded to a laminated membrane system.

It is another object of the present invention to provide a structural panel including a laminated membrane system having an outer sheet of synthetic polymer resin adhesively bonded to an oriented rubber elastomeric layer, the rubber layer itself being cold-flow or pressure bonded to a concrete panel.

Still another object of the present invention is to provide a concrete panel useful for architectural purposes and including a precolored, fluid-impervious, compression-set resistant membrane adherently attached to a surface of the panel, requiring no further painting.

It is yet another object of the present invention to provide an article comprising a laminated membrane system having a polyvinyl chloride outer sheet adhesively bonded to a polychloroprene elastomeric layer, the polychloroprene itself being cold-flow bonded to a concrete panel.

A further object of the present invention is to provide a method of fabricating a concrete panel having a laminated membrane cold-flow bonded to a surface thereof.

Yet a further object of the present invention is to provide a structural panel fabrication technique including the steps of placing a membrane system on a pouring platform, tackifying a rubber surface of the membrane system, and pouring wet concrete over the membrane, the weight of the freshly poured concrete causing the rubber to cold-flow into the concrete as the concrete hardens.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein.

DESCRIPTION OF THE PREFERRED EMBODIMENTS

Figure 1:
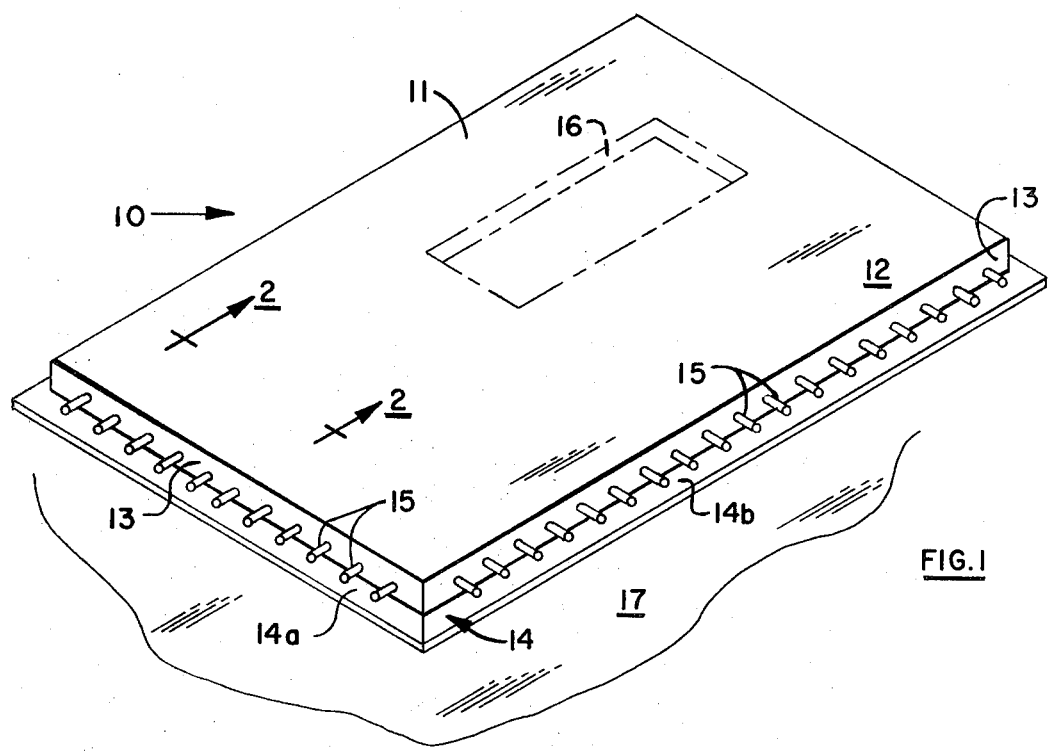
FIG. 1 is a perspective view of a membrane lined structural panel in accordance with the present invention.

Referring now to the drawings and particularly to FIG. 1 thereof, there is shown a membrane lined structural panel 10 in accordance with the present invention. Structural panel 10 includes a concrete panel 11 having an exposed face 12 and four edges 13. As described in detail herein below, a laminated membrane 14 is bonded to the face of concrete panel 11 opposite exposed surface 12. Preferably, laminated membrane 14 is slightly larger in length and width than panel 11, so as to provide overhanging membrane regions 14a and 14b. Concrete panel 11 may be provided with conventional steel reinforcing bars, the ends 15 of which project from panel edges 13. As shown in phantom in FIG. 1, structural panel 10 may be provided with an opening 16 for a window or door.

In FIG. 1, structural panel 10 is shown disposed membrane face down on a surface 17, for example the concrete floor of a factory. As will be described in detail below, surface 17 itself may serve as the pouring platform for panel 10. Panel 10 readily may be removed from surface 17, without the requirement for a release compound, since there is no tendency for membrane system 14 to stick to surface 17.

When utilized in a building, structural panel 10 may be attached in a conventional manner to the building superstructure, with surface 12 facing the interior of the building. Membrane system 14 then provides the exterior surface of the structure. The membrane overhanging portions 14a, 14b typically are jointed to the membrane of the adjacent structural panel (not shown) to form a continuous, fluid impervious exterior surface for the structure. Excess membrane overhang is trimmed away.

Figure 2:
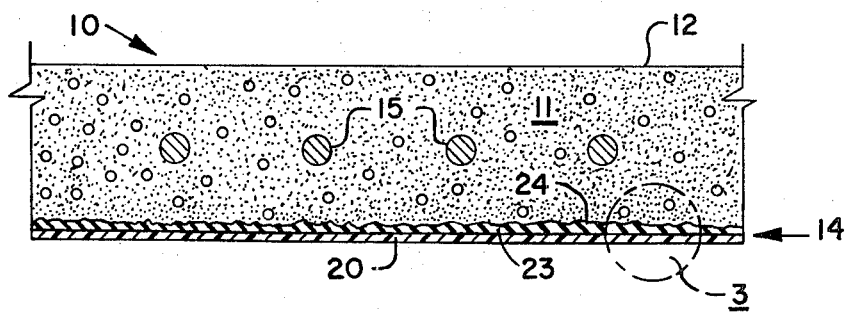
FIG. 2 is a fragmentary sectional view of the inventive membrane lined structural panel, as seen generally along the line 2–2 of FIG. 1.
Figure 3:
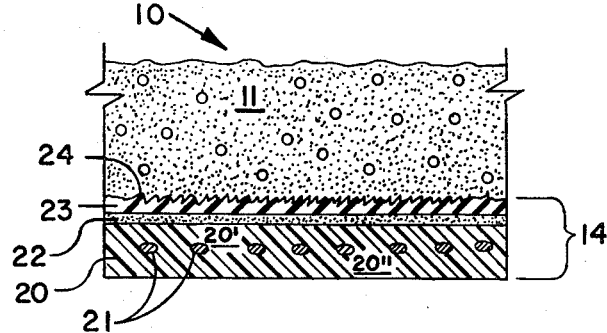
FIG. 3 is a greatly enlarged, fragmentary sectional view of the inventive structural panel, as seen generally in the area designated by phantom line 3 in FIG. 2, and showing the cold-flow bond between the membrane system and the concrete panel.

Referring now to FIGS. 2 and 3, it may be seen that laminated membrane system 14 itself comprises an outer sheet 20 of fluid impervious, flexible, synthetic polymer resin. Completely imbedded within sheet 20 is a scrim 21 of synthetic resin fiber. Bonded to outer sheet 20, by means of an adhesive 22, is a rubber elastomeric layer 23 wherein the rubber may exhibit preferred resilience parallel to the plane of layer 23. Additional details concerning membrane system 14 are set forth hereinbelow. Alternatively, the inventors copending U.S. application, Ser. No. 2,075, filed Jan. 12, 1970, entitled "MEMBRANE SYSTEM," describes a membrane system also useful with the present invention.

As best shown in FIG. 3, elastomeric layer 23 itself is cold-flow bonded to concrete panel 11, the resultant interface 24 being very irregular. The nature of the cold-flow bond between elastomeric layer 23 and concrete panel 11 is such that it is extremely difficult, if not impossible, to remove or disbond membrane system 14 from panel 11. In face, even if membrane 14 were pulled away from concrete panel 11, it is more likely that the membrane system would become delaminated than that the bond at interface 24 would be broken. However, this is not to imply that membrane system 14 may be delaminated readily; just the opposite is true. Particularly in the preferred embodiments described below, membrane system 14 is extremely difficult to delaminate.

As noted, FIGS. 2 and 3 are greatly enlarged, and the actual overall thickness of membrane system 14 is on the order of from about 0.015 inch to about 0.080 inch. Of this total thickness, elastomeric layer 23 itself accounts for between about 0.007 inch to about 0.070 inch. While having a very small thickness, membrane system 14 typically will have a very large surface area. Thus, membrane system 14 may be manufactured in rolls which are several feet wide by several hundred feet long.

In a typical manufacturing process, outer sheet 20 initially may be formed of two independent layers, generally designated 20' and 20" in FIG. 3. Scrim 21, which preferably is coextensive with outer layer 20, then may be sandwiched between layers 20' and 20", and the composite heated to above the melting temperature of the resin used for outer sheet 20, but below the melting temperature of the material of scrim 21. This operation, which may be accomplished in a heater calender, fusion bonds layers 20' and 20" together, to form the unitary, scrim-embedded outer sheet 20 illustrated in FIG. 3. Alternatively, a laminator may be used to fusion bond layers 20' and 20".

Elastomeric layer 23 may be applied to outer sheet 20 using a conventional three-roll calender. In such a calender, the upper two rollers rotate in opposite directions and act as a mill into the nip of which is fed the rubber composite used to form elastomeric layer 23. Adhesive 22 is precoated onto the surface of outer sheet 20, and the adhesive coated sheet fed between the lower two rollers of the three-roll calender. The blanket of rubber which forms around the central roll of the calender then becomes bound to adhesive 22 to complete fabrication of membrane system 14. Such a fabrication technique permits membrane system 14 to be formed in extremely long webs which immediately may be wound into rolls for convenience of handling.

The calendering process by which elastomeric layer 23 is applied also appears to cause anisotropic orientation or crystallization of certain types of rubber used for elastomeric layer 23. While the exact mechanism is unclear, this anisotropic orientation permits layer 23 to exhibit a "slip-sheet" effect. However, such anisotropic orientation is not required, and the inventive membrane lined structural panel also encompasses the use of nonoriented rubber for elastomeric layer 14.

The "slip-sheet" effect characteristic of certain embodiments of elastomeric layer 23 is described further in the above-cited U.S. Pat. application entitled "MEMBRANE SYSTEM." In general, such an elastomeric layer 23 exhibits a crystalline structure having planes or layers parallel to the plane of membrane system 14. Each such crystalline plane exhibits considerable resilience parallel to the layer 23, while exerting minimal transverse force between adjacent planes. Thus, if the coefficient of expansion of concrete is greater than that of outer sheet 20, as panel 11 thermally expands or contracts, the concrete will pull with it the adjacent crystalline plane (not shown) of elastomeric layer 23. This crystalline plane can tolerate extreme elongation without exceeding the elastic limit of the rubber. Since there is relatively little transverse force exhibited between adjacent crystalline planes, the expansion of the crystalline plane adjacent sheet 20 will be much more closely related to expansion of outer sheet 20 than to expansion of concrete panel 11. This characteristic, which herein is called the "slip-sheet" effect, permits elastomeric layer 23 effectively to isolate outer sheet 20 from expansion or movement of concrete panel 11. The "slip-sheet" effect of elastomeric layer 23 also is capable of bridging a crack or fissue in concrete panel 11, even though the gap size should increase many fold, with minimal transmission of the resultant lateral force to outer sheet 20.

As noted earlier, elastomeric layer 23 need not comprise an oriented rubber exhibiting a "slip-sheet" effect, alternatively unoriented rubber may be used for layer 23. Such unoriented rubber provides sufficient isolation to compensate for the expansion and contraction of concrete panel 11 typically encountered in temperate climates or like applications wherein structural panel 10 is not exposed to extremes of temperature.

Preferably, outer sheet 20 comprises polyvinyl chloride together with appropriate additives as discussed below, Alternatively, synthetic polymer resins such as chlorosulphonated polyethylene, polypropylene, long-chain ethylene propylene, or high molecular weight polyethylene may be used for outer sheet 11.

It is desirable that appropriate stabilizers be included with the resin to prevent degradation upon exposure of outer sheet 20 to heat, oxygen, sunlight and the like. In addition, a plasticizer preferably is employed to enhance the weathering properties and toughness of outer sheet 20. Other additives, such as epoxy resin may be used further to improve the toughness and abrasion resistance of membrane system 14. The following Table 1 indicates an exemplary formulation for outer sheet 20 based on polyvinyl chloride. Included in the table are acceptable ranges for each ingredient, as well as a preferred formulation, all set forth in parts by weight of the constituents.

TABLE 1

| Ingredient | Preferred Amount | Acceptable Range |
|---|---|---|
| 1. Vinyl Chloride Polymer | 59.00 | 40.00–60.00 |
| 2. Polymeric Plasticizer | 26.66 | 20.00–35.00 |
| 3. Aluminum Silicate | 15.00 | 10.00–30.00 |
| 4. Epoxy Resin | 9.16 | 5.00–15.00 |
| 5. Cadmium Barium Stabilizer | 1.50 | 1.00–3.00 |
| 6. Zinc Stabilizer | 0.16 | 0.10–1.50 |
| 7. Organic Chelate | 0.33 | 0.20–1.00 |
| 8. Stearic Acid | 0.04 | 0.02–0.07 |
| 9. Titanium Dioxide | 3.33 | 1.00–5.00 |
| 10. Black Iron Oxide | 0.19 | 0 –2.00 |
| 11. Ultramarine Blue | 0.04 | 0 –1.00 |
| 12. Yellow Iron Oxide | 0.02 | 0 –0.06 |
| | 115.43 | |

The polymeric plasticizer included in the formulation of Table 1 typically may comprise polypropylene adipate, a polymer of relatively low molecular weight which has good leach resistant properties. This plasticizer, together with the epoxy resin impart extreme toughness to outer sheet 20. The aluminum silicate is a reinforcing agent which improves abrasion and tear resistance of the sheet. The titanium dioxide acts as a ultraviolet screen and colorant, and together with the polymeric plasticizer and the high or medium-high molecular weight vinyl chloride polymer give outer sheet 20 excellent weathering properties. The cadmium barium stabilizer further acts to prevent degradation of outer sheet 20 upon exposure to heat, oxygen and sunlight.

The preferred formulation set forth in Table 1 provides an outer layer 20 which has extremely good toughness, weathering properties and resistance to abrasion, "comprssion-set" and other physical abuse. The material is not softened or degraded by lubricating oils, greases or like fluids spilled thereon.

Scrim 21 (FIG. 3) preferably comprises nylon, Dacron or polyester. These materials exhibit high tensile strength on tear, but also exhibit sufficient elongation so as not to be ruptured should outer layer 20 be stretched or distended. Preferably, scrim 21 is placed near the middle or toward the lower portion of outer sheet 20. It has been found that if scrim 21 is placed too close to the upper surface of outer sheet 20, some "creep" results in membrane system 14.

Scrim 21 also acts to resist dimensional changes in outer sheet 20. Thus while polyvinyl chloride systems typically show long-term shrinkage of from three to 10 percent, the presence of scrim 21 bonded within outer sheet 20 significantly decreases the effective long-term shrinkage of this sheet. Scrim cloth 21 also prevents the opening of seams or other large ruptures within membrane system 14. As an alternative material, fiber glass may be used for scrim 21. Fiber glass has almost zero elongation, and thus is preferred for applications wherein the dimensional stability added by the glass is desirable, but wherein membrane system 14 is not exposed to extreme elongation forces. In alternative embodiments of the invention, wherein reduced mechanical strength of membrane system 14 can be tolerated, scrim 21 may be omitted entirely from outer sheet 20.

Elastomeric layer 23 preferably is formed of polychloroprene (Neoprene) rubber, however, other materials such as acrylonitrile, the polymerization product of butadiene and acrylonitrile, styrene-butadiene, polybutadiene, butyl rubber and chlorinated butyl rubber also may be employed. A minimum thickness of about 0.007 inch is desirable for elastomeric layer 23, to provide sufficient "slip-sheet" effect as described hereinabove. Such minimum thickness also insures that the rubber will be in continuous contact with concrete panel 11. Further, thicknesses of less than about 0.007 inch are difficult to calender.

On the other hand, it is desirable that elastomeric layer 23 not exceed a maximum thickness of about 0.070 inch. If the thickness is considerably greater than this, there is a tendency for membrane system 14 to exhibit "creep" under extreme stress, a problem which could result in rupture or delamination of outer sheet 20. The preferred thickness range for elastomeric layer 23 is from about 0.008 inch to about 0.050 inch.

Table 2 below shows acceptable formulations based on polychloroprene for elastomeric layer 23. Acceptable ranges for each ingredient are indicated, together with a preferred formulation indicated in parts by weight of each constituent.

TABLE 2

| Ingredient | Preferred Range | Acceptable Range |
|---|---|---|
| 1. Polychloroprene | 45.0 | 30.00–60.00 |
| 2. Magnesium Oxide | 2.0 | 1.00– 4.00 |
| 3. Zinc Oxide | 3.0 | 2.00– 6.00 |
| 4. Antioxidant | 1.5 | 1.00– 2.00 |
| 5. Accelerator | 1.0 | 0.50– 2.00 |
| 6. Stearic Acid | 0.5 | 0 – 0.95 |
| 7. Carbon Black | 25.0 | 10.00–35.00 |
| 8. Calcined Clay | 22.0 | 15.00–50.00 |
| 9. Calcium Carbonate | 16.0 | 10.00–30.00 |
| 10. Process Oil | 4.0 | 4.00–15.00 |
| | 120.0 | |

Zinc oxide, together with magnesium oxide and an accelerator are included in the formulations of Table 2 to produce vulcanization of the rubber. The antioxident reduces long-term degradation of the rubber since oxidation occurs preferentially on the antioxident rather than on the polychloroprene. Carbon black is included to prevent degradation due to ultraviolet light, and, together with the calcined clay, enhances the tensile and tear strength and abrasion resistance of the material.

The preferred polychloroprene rubber formulation set forth in Table 2 readily may be calendered onto outer sheet 11, as described generally hereinabove, to provide an elastomeric layer 23 having excellent "slip-sheet" characteristics. Further, the compound has good resistance to oils and the like, low "-tack," and good fire-retardant properties which permit the inventive membrane system to comply with building and safety code requirement. The membrane system also meets insurance underwriter requirements for self-extinguishing, relatively nonflammable materials.

When elastomeric layer 23 comprises a polychloroprene rubber formulation such as that set forth in Table 2, adhesive 22 (FIG. 3) may comprise a polychloroprene polymer modified with a suitable phenolic resin and other additives. Table 3 below shows acceptable formulations for the solids portion of such an adhesive, and indicates both acceptable ranges and preferred parts by weight of each ingredient.

TABLE 3

| Ingredient | Preferred Range | Acceptable Range |
| --- | --- | --- |
| 1. Polychloroprene | 100 | 30.00–75.00 |
| 2. Zinc Oxide | 5 | 2.00– 6.00 |
| 3. Magnesia | 4 | 2.00– 5.00 |
| 4. Antioxidant | 2 | 1.00– 2.50 |
| 5. Phenolic | 50 | 30.00–60.00 |
| 6. Red Iron Oxide | 4 | 3.00– 6.00 |
| 7. Chlorinated Rubber | 5 | 2.00– 7.00 |
|  | 170 |  |

To prepare the adhesive, the polychloroprene initially is milled thoroughly to break down the polymer. The other ingredients then are added and mixed until a smooth consistency is achieved. The compound then is shredded and added to a suitable solvent system preferably containing tetrahydrafuran which improves adhesion to polyvinyl chloride outer sheet 20 by its solvating action on the vinyl surface.

An acceptable solvent system for use with the formulation of Table 3 may comprise 20 parts by weight toluene, 70 parts by weight of methylethyl ketone and 10 parts by weight of tetrahydrafuran. Sufficient solvent is used so that approximately 30 percent solids is present in the adhesive.

Figure 4:
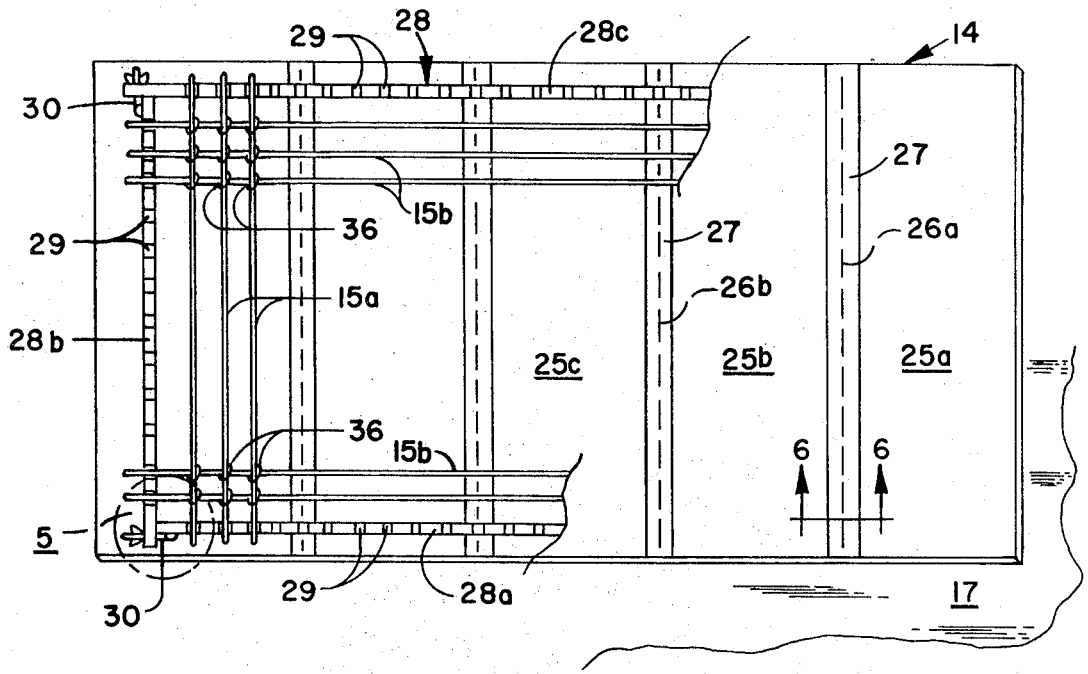
FIG. 4 is a top plan view of a membrane system and pouring frame of a type which may be utilized to form the structural panel of FIG. 1.

The manner in which structural panel 10 may be fabricated is illustrated in FIG. 4. Referring thereto, membrane system 14 initially is placed on pouring platform 17 with resin outer sheet 20 facing the pouring platform. As noted earlier, pouring platform 17 may simply comprise the concrete floor of a factory. Alternatively, pouring platform 17 may comprise any appropriate rigid surface.

The size of structural panel 10 may be larger than the width of a single web of membrane 14. In this instance, membrane system 14 may comprise a plurality of membrane section 25a, 26b, 15C (FIG. 4) placed in edge-abutting relationship. Thus in FIG. 4, the broken line 26a designates the abutting edges of membrane sections 25a and 25b. Similarly, broken line 26b designates the abutting edges of membrane sections 25b and 25c. To provide a leakproof joint, each interface 26a26b is overlayed with a membrane strip 27, details of which are set forth hereinbelow in conjunction with FIG. 6. Although not shown in FIG. 4, a rubber-based adhesive may be coated over each membrane strip 27.

Next, an appropriate pouring frame 28 is positioned atop membrane system 14. In the embodiment shown in FIGS. 4 and 5, pouring frame 28 comprises a set of side boards 28a, 28b, 28c which typically are fabricated of wood. Each sideboard 28a, 28b, 28c contains a plurality of notches 29 extending downward from the respective top edge thereof. The boards forming frame 28 are joined by means of appropriate quick-release fasteners 30.

Figure 5:
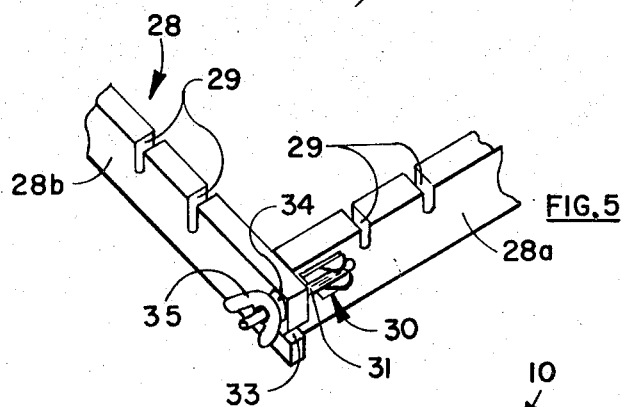
FIG. 5 is a fragmentary perspective view of the pouring frame, as seen generally in the region designated by phantom line 5 in FIG. 4.

As best shown in FIG. 5, each fastener 30 includes a threaded bolt portion 31 which is pivotally attached to a mounting plate 32. In FIG. 5, plate 32 is shown attached adjacent one end of board 28a. Bolt 31 is sufficiently long so as to extend through a slot 33 provided in the end of board 28b. A washer 34 and a wingnut 35 engage bolt 31 and are used to tighten board 28b against the end of board 28a.

Referring again to FIG. 4, reinforcing bars 15a, 15b are disposed in slots 29 and extend between the parallel sideboards of frame 28. For example, one end of each reinforcing bar 15a is disposed in a slot 29 in board 28a and the other end is disposed in a slot 29 in board 28c. Appropriate steel ties 36 may be employed to join each intersection of reinforcing bars 15a and 15b.

Either before or after frame 28 and reinforcing bars 15a, 15b have been set in place, the exposed elastomeric layer 23 of membrane system 14 is tackified. This is accomplished by spraying or otherwise applying an appropriate solvent to the exposed rubber surface. For example, in embodiments wherein elastomeric layer 23 comprises polychloroprene or acrylonitrile, appropriate solvents include methyl ethyl ketone and methyl isobutyl ketone. Alternatively, if elastomeric layer 23 comprises a butadiene rubber or chloronated butyl rubber, appropriate solvents include hexane, mineral spirits, toluene and xylene. Sufficient solvent is used to make elastomeric layer 23 soft and tacky.

As an alternative to application of a solvent, membrane system 14 may be tackified by spraying or otherwise covering elastomeric layer 23 with a tack solution. Typically, such tack solution may comprise a rubber-based adhesive, the formulations of Table 3 also being acceptable for this purpose. The tack solution cold-flows into concrete panel 10 and cooperates elastomeric layer 23 to form an extremely adherent bond therebetween.

The next step for fabricating structural panel 10 is to pour wet concrete on top of tackified membrane system 14 and within frame 28. As the concrete cures or hardens to form concrete panel 11 (FIGS. 1–3), the tackified rubber of elastomeric layer 23 cold-flows up into the concrete layer to form the bonded interface 24 shown in FIGS. 2 and 3. By the time concrete 11 has hardened, this cold-flow process produces an extremely strong bond between membrane system 14 and concrete panel 11.

Subsequent to hardening of concrete panel 11, frame 28 readily may be removed by loosening wingnuts 35, pivoting bolts 31 out of slots 33, and removing frame sideboards 28a28b, 28c. The resultant membrane lined structural panel 10 has the appearance shown in FIG. 1. Panel 11 readily can be removed from pouring platform 17 without the use of a release compound, since there is no tendency for resin outer sheet 20 to stick to platform 17.

The above-described technique will produce a structural panel 10 having a flat exterior surface. However, the invention is by no means so limited. Thus, for example, if a fluted or corrugated exterior surface is desired, this readily can be achieved in the following manner. Prior to placing membrane system 14 atop platform 17 (FIG. 4), a series of spaced-parallel dowels (not shown) are set on pouring platform 17. Membrane system 14 then is placed atop the dowels, typically with one edge of membrane 14 parallel to the preferably half-round dowels.

An appropriate pouring platform (not shown) next is placed over membrane system 14, rubber layer 23 tackified, and wet cement poured, all as described above. The weight of the cement will press membrane system 14 down into conformal contact with the dowel and the regions of pouring platform 17 therebetween, and panel 11 will harden in this configuration.

The resultant structural panel will have the desired fluted or corrugated external appearance.

Clearly, this technique also can be extended to obtain panels with other exterior surface appearances. Note also that if an arcuate pouring platform is used, the resultant structural panel itself will have an arcuate configuration.

The inventive structural panel 10 may be case, either horizontally or vertically, directly at the building site. To fabricate panel 10 vertically, a conventional upright pouring form initially is lined with a membrane system 14, the membrane being held in place by means of tack strips along the top and bottom edges. The elastomeric layer 23 is tackified, either before or after membrane 14 is placed in the frame, and wet concrete is poured. As described above, a cold-flow bond is formed between membrane 14 and concrete panel 11 as the concrete hardens.

The invention also is useful for subgrade waterproofing. In such application, structural panels 10, either prefabricated or poured onsite, are situated below grade with outer sheets 12 facing toward the sides of an excavation site. The fluid-impervious characteristics of membrane system 14 prevent leakage of water into the subgrade portions of the building under construction.

Figure 6:
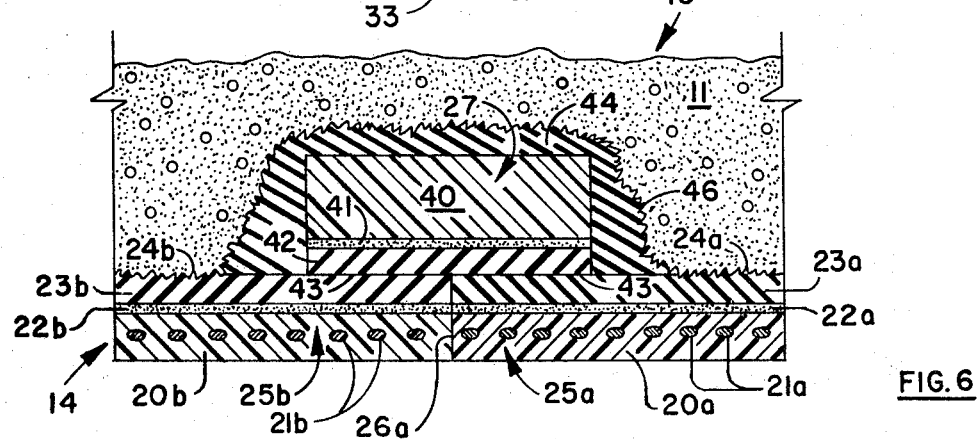
FIG. 6 is a greatly enlarged, fragmentary sectional view of a joint which may be utilized between abutting membrane sections such as seen along the line 6–6 of FIG. 4.

The membrane system joint mentioned above (in connection with FIG. 4) is shown in greater detail in FIG. 6. Referring thereto, membrane system 14 again is seen to include two sections 25a and 25b having abutting edges generally designated 26a. Membrane section 25a itself includes an outer sheet 20a imbedded in which is a screen 21a, an adhesive 22a and an elastomeric layer 23a. Similarly, membrane section 25b includes an outer sheet 20b having an imbedded scrim 21b, an adhesive 22b and an elastomeric layer 23b. The laminate constituents of membrane sections 25a and 25b are identical to the unlettered, but like numbered elements described above in conjunction with FIG. 3.

Membrane strip 27 (FIG. 6) itself may comprise a strip 40 of fluid-impervious, synthetic polymer resin bonded by means of an adhesive 41 to a rubber elastomeric strip 42. The materials of resin strip 40, adhesive 41, and rubber elastomeric strip 42 may be the same as those described hereinabove for the resin, adhesive and rubber portions of membrane system 14.

Note in FIG. 6 that elastomeric strip 42 of membrane strip 27 is placed in direct contact with the portions of the elastomeric layers 23a and 23b adjacent abutting edge interface 26a. The resultant rubber-to-rubber interface 43 is fluid impervious, and prevents any liquid which might leak in through interface 26a from flowing between membrane sections 25a or 25b and concrete panel 11. The fluid seal along interface 43 further can be improved by tackifying rubber layers 23a, 23b and 42 before overlaying membrane strip 27 onto membrane system 14. When membrane strip 27 then is put in place, the interface 43 becomes almost undistinguishable as the adjacent rubber layers 42, 23a and 23b cold-flow together.

Prior to pouring the wet concrete for panel 11, each membrane strip 27 may be covered with a rubber-based mastic or adhesive 44. Typically such mastic may comprise a high solids version of the adhesive formulation set forth in Table 3 above. Layer 44 is tackified at the same time that elastomeric layers 23a, 23b of membrane system 14 are tackified. As a result, when wet concrete 11 is poured over the joint, rubber from layer 44 tends to cold-flow into concrete 11 in the same way that the tackified rubber of layers 23a, 23b cold-flows into concrete 11. This results in a strong bond between layer 44 and concrete 11, as indicated generally by the irregular line 46 in FIG. 6. Note that cold-flow bond 46 connects with cold-flow bonds 24a and 24b (between concrete 11 and respective rubber layers 23a and 23b), to form a continuous, fluid-impervious, mechanically strong bond between membrane system 14, including membrane strip 27, and concrete panel 11.

Alternatively, any of the joints set forth in the inventor's U.S. Pat. No. 3,475,260 may be employed to seal the interfaces between sections 25a, 25b 25c of membrane system 14.

While the invention has been described with respect to the preferred physical embodiments constructed in accordance herewith, it will be apparent to those skilled in the art that various modifications and improvements may be made without departing from the scope and spirit of the invention.

I claim:

1. An article comprising:
   a laminated membrane system bonded to a concrete structural panel to provide a fluid impervious surface therefor, said membrane system comprising;
   an outer sheet of fluid-impervious, flexible, synthetic polymer adhesively bonded to a rubber elastomeric layer, said layer also being bonded to said concrete panel across an irregular interface having projections or rubber extending into said concrete, said rubber exhibiting resilience within the plane of said elastomeric layer whereby lateral forces exerted on said elastomeric layer by expansion or contraction of said concrete panel are isolated by said elastomeric layer from said outer sheet.

2. An article as defined in claim 1 wherein said elastomeric layer has a thickness of between about 0.007 and about 0.070 inch and wherein said membrane system has an overall thickness of between about 0.015 inch and about 0.080 inch.

3. An article as defined in claim 1 wherein said elastomeric layer is coextensive with said sheet, said rubber having a generally planar crystalline structure, planes of said rubber being substantially independently, resiliently extensible parallel to said layer.

4. An article as defined in claim 1 wherein said membrane system comprises abutting sections, said article further comprising;
   a membrane strip overlapping the abutting edges of said sections, said strip comprising a rubber layer facing the elastomeric layers of said abutting sections, and a synthetic polymer resin strip adhesively bonded to said rubber layer, and
   a rubber-based adhesive interfacing said membrane strip and said concrete panel, said membrane strip thereby being totally enclosed within said article.

5. An article as defined in claim 1 wherein said outer sheet comprises polyvinyl chloride, wherein said rubber comprises polychloroprene, and wherein said elastomeric layer is bonded to said outer sheet by means of an adhesive comprising polychloroprene, phenolic and zinc oxide in a solvent system containing tetrahydrafuran.

6. An article as defined in claim 1 wherein said rubber comprises one of polychloroprene, acrylonitrile, the polymerization product of butadiene and acrylonitrile, styrene-butadiene, polybutadiene, butyl rubber and chloronated butyl rubber.

7. An article as defined in claim 6 wherein said synthetic polymer comprises one of polyvinyl chloride, chlorosulphonated polyethylene, polypropylene, long-chain ethylene propylene and high molecular weight polyethylene.

8. An article as defined in claim 6 further comprising a synthetic resin scrim embedded in said outer layer.

9. An article as defined in claim 8 wherein said synthetic fiber scrim comprises one of nylon, polyethylene-terephthalate, polyester and fiber glass.

* * * * *

UNITED STATES PATENT OFFICE
CERTIFICATE OF CORRECTION

Patent No. 3,642,559            Dated February 15, 1972

Inventor(s) WILLIAM S. STOKES

It is certified that error appears in the above-identified patent and that said Letters Patent are hereby corrected as shown below:

Column 10, after line 66, insert the following claim:

--10. A membrane lined structural panel comprising a concrete slab having a first major surface and an outer sheet of fluid impervious, flexible, synthetic polymer coextensive with said major surface and separated therefrom by an intermediate elastomeric layer of rubber having a generally planar crystalline structure, planes of said rubber being substantially, independently, resiliently extensible within the plane of said layer to isolate lateral expansion forces of said slab from said outer sheet.--

On the cover sheet "9 Claims" should read -- 10 Claims --.

Signed and sealed this 11th day of July 1972.

(SEAL)
Attest:

EDWARD M. FLETCHER, JR.         ROBERT GOTTSCHALK
Attesting Officer                Commissioner of Patents